No. 789,139. Patented May 9, 1905.

UNITED STATES PATENT OFFICE.

SAMUEL BOOTH, OF LONDON, ENGLAND, ASSIGNOR TO THE BOOTH'S PROCESS LIMITED, OF LONDON, ENGLAND.

MANUFACTURE OF COMPOSITIONS FOR MAKING PRINTING-SURFACES.

SPECIFICATION forming part of Letters Patent No. 789,139, dated May 9, 1905.

Application filed May 13, 1904. Serial No. 207,848.

*To all whom it may concern:*

Be it known that I, SAMUEL BOOTH, a subject of the King of Great Britain and Ireland, residing at Messrs. Weiners, Limited, of Wybert street, Munster Square, London, England, but at present of 209 Ross street, borough of Brooklyn, city of New York, county of Kings, State of New York, have invented a certain new and useful Manufacture of Compositions for Making Printing-Surfaces, of which the following is a specification, for which I have applied for a patent in Great Britain, dated December 9, 1903, No. 26,953.

This invention relates to the manufacture of printing-surfaces from a composition containing as its principal constituents rosin or the like and ozocerite or ceresin or like waxy materials in proportion varying with the temperature at which the printing-surface is to be used. With these is mixed a proportion of sulfur, which may be quite small, and, if necessary, some boiled oil or the particular form of boiled oil known as "rosin-oil varnish" or that known as "linseed-oil varnish."

For example, in a suitable vessel is melted thirty parts, by weight, of rosin, the heat being continued until the liquid begins to froth. There is next stirred into the vessel two parts of sulfur, and when this has been mixed with the melted rosin as far as possible twenty-five parts, by weight, of ozocerite are added, the mixture being stirred until the ozocerite has melted. Finally, there is added three parts, by weight, of boiled rosin-oil, and when the whole has been thoroughly mixed it is cast into a suitable frame and allowed to cool. It is then broken up, remelted, and once again cast, these two operations being repeated until the mass is homogeneous.

The object of adding sulfur to the mixture is to toughen the mass and to improve the printing-surface, which it does by settling during the casting process, hereinafter described, to the bottom of the mass in the matrix, which bottom is afterward the printing-surface. The sulfur in the latter makes it take the ink better.

The object of adding boiled rosin-oil to the mixture is to obtain the best printing-surface. It is not essential to have this varnish in the mixture in order to obtain a printing-surface.

The proportions named above for the rosin and ozocerite are for the production of a printing-surface which is to be used at the average temperature. Should the temperature be higher, the proportion of rosin would be increased. If the temperature were lower, the proportion of ozocerite would be increased. Exact correlation of temperature and proportions can hardly be given; but the workman will soon ascertain the best proportions for the temperature of the printing-shop. To make a printing-surface from this material, the melted mixture may be poured into any suitable matrix, allowed to solidify, and afterward separated from the matrix. According to this invention, however, a matrix particularly suitable for use with this composition is made in the following manner: On a suitably hard surface, such as a slab of polished marble, is cast or laid a thick sheet of material which is easily cut, like wax, preferably beeswax, which may be hardened with paraffin-wax or softened with a paraffin-oil or the like, the object being to give the wax such a consistence that it cuts without cracking and without dragging on the cutting implement. The solid sheet is now cut through to make the matrix, the cut parts being removed. This matrix may be used with any suitable material for making printing-surfaces which is not cast at too high a temperature. For use with the composition referred to above it is rubbed over, either before or after it has been cut and while still on the hard surface, with a material suitable for preventing the composition from sticking to it—such as glycerin, to which a little starch is added immediately before use. The matrix is surrounded by a frame and the molten and well-mixed composition is poured into the frame at a temperature which will not melt the wax. When the composition has set, the frame is turned over and the matrix removed. The sheet thus obtained is used as the printing-surface, and if it be sufficiently thick—namely, type-high, as is convenient in using it on the usual printing-machine—it is rigid enough to be used without a backing. Of course a thin sheet may require to be backed.

I claim—

1. A composition for the manufacture of printing-surfaces consisting of rosin, a waxy material, like mineral wax, and sulfur, substantially as described.

2. A composition for the manufacture of printing-surfaces consisting of rosin, a waxy material, like mineral wax, sulfur and a boiled oil, such as boiled rosin-oil, or boiled linseed-oil, substantially as described.

3. A process of manufacture of a composition for making printing-surfaces by first melting rosin, then adding to the molten mass sulfur and a waxy material, and finally alternately cooling and melting the mixture until it is homogeneous.

4. A process of manufacture of a composition for making printing-surfaces by first melting rosin, then adding to the molten mass sulfur, a waxy material and a boiled oil, and finally alternately cooling and melting the mixture until it is homogeneous.

In testimony whereof I have signed my name to this specification in the presence of two subscribing witnesses.

SAMUEL BOOTH.

Witnesses:
GEO. J. VANDERHIDE,
RICHARD W. LEE.